(12) United States Patent
Leary et al.

(10) Patent No.: US 10,857,634 B2
(45) Date of Patent: Dec. 8, 2020

(54) APPARATUS AND METHOD FOR INSERTION OF GASKETS

(71) Applicants: Steven Leary, Winter Park, FL (US); Margaret Fitzgerald, Winter Park, FL (US)

(72) Inventors: Steven Leary, Winter Park, FL (US); Margaret Fitzgerald, Winter Park, FL (US)

(73) Assignee: Flange Skillets International, LLC, Kissimmee, FL (US)

( * ) Notice: Subject to any disclaimer, the term of this patent is extended or adjusted under 35 U.S.C. 154(b) by 0 days.

(21) Appl. No.: 14/080,255

(22) Filed: Nov. 14, 2013

(65) Prior Publication Data

US 2015/0020363 A1    Jan. 22, 2015

Related U.S. Application Data

(60) Provisional application No. 61/749,011, filed on Jan. 4, 2013, provisional application No. 61/791,959, filed on Mar. 15, 2013.

(51) Int. Cl.
*B23P 19/04* (2006.01)
*B25B 27/16* (2006.01)
*B25B 27/00* (2006.01)

(52) U.S. Cl.
CPC .......... *B23P 19/04* (2013.01); *B25B 27/0028* (2013.01); *B25B 27/16* (2013.01); *Y10T 29/49826* (2015.01); *Y10T 29/53* (2015.01)

(58) Field of Classification Search
CPC ................. B25B 27/0028; B25B 27/16; Y10T 29/53657
See application file for complete search history.

(56) References Cited

U.S. PATENT DOCUMENTS

| | | | |
|---|---|---|---|
| 2,339,479 A * | 12/1942 | Mccreary | F16L 23/22 288/27 |
| 4,434,978 A | 3/1984 | Kloster | |
| 4,495,690 A * | 1/1985 | McNeal | B25B 13/52 269/131 |
| 2011/0167607 A1 | 7/2011 | Vidrine | |

FOREIGN PATENT DOCUMENTS

| | | |
|---|---|---|
| WO | 2007083203 A2 | 7/2007 |
| WO | 2013109286 A1 | 7/2013 |

* cited by examiner

*Primary Examiner* — David P Bryant
(74) *Attorney, Agent, or Firm* — Jason P. Mueller; FisherBroyles, LLP

(57) ABSTRACT

Gasket insertion apparatuses with bendable arms that provide quick, safe and efficient alignment and installation of gaskets between opposing flanges of a flange assembly. Methods to install gaskets between opposing flanges by aligning gaskets within a flange assembly using alignment arms of an insertion apparatus.

27 Claims, 10 Drawing Sheets

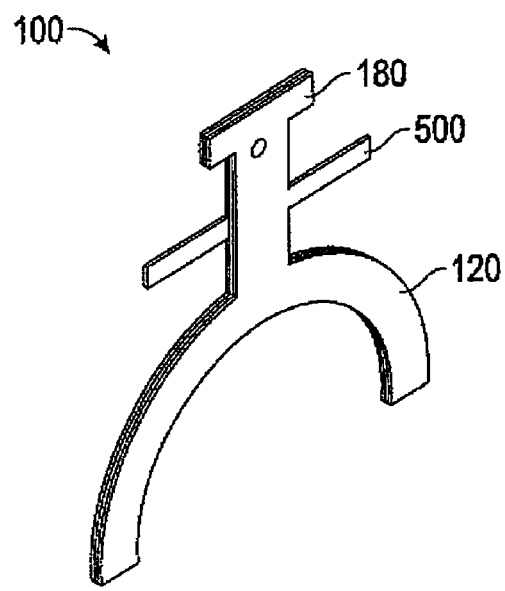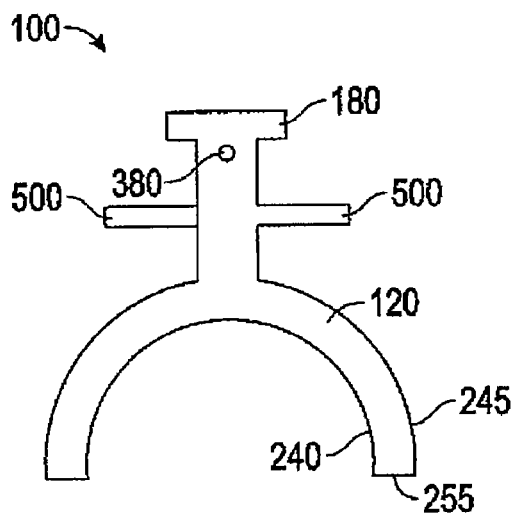
FIG. 4     FIG. 5
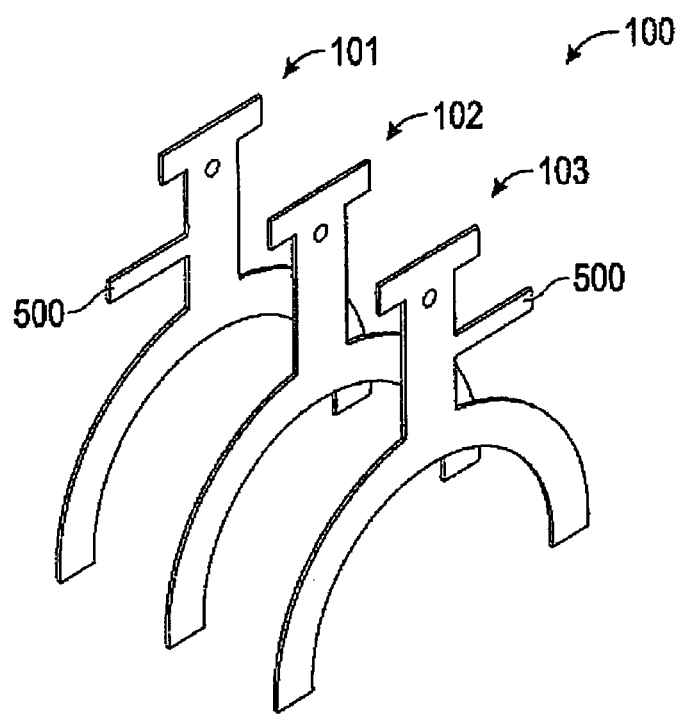
FIG. 6

APPARATUS AND METHOD FOR INSERTION OF GASKETS

CROSS-REFERENCE TO RELATED APPLICATIONS

This application claims benefit of U.S. Provisional Application 61/749,011 filed Jan. 4, 2013, entitled "Improved Apparatus and Method for Insertion of Gaskets" and U.S. Provisional Application 61/791,959 filed Mar. 15, 2013, entitled "Improved Apparatus and Method for Insertion of Gaskets," which are incorporated herein by reference.

FIELD

The invention relates generally to an apparatus and method for insertion of gaskets and, more particularly, to an apparatus for and a method of inserting sealing gaskets between flange connectors of adjacent pipe sections of underwater pipe line sections.

BACKGROUND

In laying underwater pipelines, divers or remotely operated vehicles ("ROV"s) are often utilized to bolt together opposing connector flanges of adjacent pipe sections. Gas and fluid sealing gaskets are typically installed between the flanges. In order to do so, the divers, either directly or through the use of an ROV, often must hold opposing connector flanges in a relatively stationary position in order to insert the fluid sealing gasket between these opposing flanges prior to completing the bolting operations that will join these opposing flanges together.

Some flange assemblies, such as American National Standards Institute (ANSI) specified ring-type joint (RTJ) flange assemblies, are designed such that there is a space or gap between the flange faces to allow all or a portion of a gasket insertion device to remain in the completed assembly once the gasket is in place. However, other types of RTJ flange assemblies, such as the American Petroleum Institute (API) specified (S)BX flange assemblies and "compact flange" assemblies, which use an SPO or IX/HX gasket, do not have a space or gap between the flange faces. In such situations, gasket insertion devices that are designed to leave a portion of the device inside of the flange assembly after placement of the gasket cannot be used because there is no gap to accommodate the remaining portion of the device.

When making the bolted connections between opposing flanges, a diver must guard against having his hands caught between the flanges of these adjacent pipe segments to avoid injury. Gasket insertion devices have been utilized to hold the sealing gaskets in a desired position between the opposing flanges to guard against injury to the fingers and hands of the diver and to avoid damage to the gaskets. In order to ensure placement of the gaskets, the gasket insertion devices must be aligned to a proper depth in the gap between faces of opposing flanges. Typically, alignment is accomplished by inserting alignment pins or bolts before securing the opposing flanges together.

It is desirable to have a gasket placement device that provides for easy gasket insertion and alignment without the need for separate placement pins or bolts for alignment.

SUMMARY

In an embodiment of the present invention, a gasket insertion apparatus is provided, having: a frame; a handle; and at least one arm member extending from the handle. The frame is configured such that a gasket may be mounted therein. The arm member is flexible such that arm member may be bent. A bottom edge of the arm member is configured to rest upon a flange of a flange assembly when the apparatus is inserted between opposing flanges of the flange assembly and the gasket placed into the apparatus prior to insertion between the opposing flanges of the flange assembly is aligned within the flange assembly such that when the opposing flanges are closed, the gasket is secured within the flange assembly.

The frame, the handle and the at least one arm member may be substantially flat and substantially in plane with each other. The arm member may be configured to be bent out of plane with the frame and the handle. A distance between the bottom edge of the arm member and an interior periphery of the frame may be configured to align the gasket within the flange assembly.

The frame may have an open-ended shape. The frame may be a curved frame having a circumference that is approximately 55% of a circumference of a completely circular frame of a same radius. The frame may be a curved frame having a circumference that is less than 50% of a circumference of a completely circular frame of a same radius. The frame may be substantially circular.

The apparatus may or may not include a plurality of teeth along an interior periphery of the frame. The gasket insertion apparatus may include an adhesive along an interior periphery of the frame. The gasket insertion apparatus may include a slit beginning at an interior periphery of the frame and extending radially along a handle shaft of the handle. The gasket insertion apparatus may include a channel in a handle shaft of the handle, the channel having a width and a depth sufficient to accommodate a stem of a leak test gasket.

The gasket insertion apparatus may include a retention wire configured to retain the gasket within the frame. The retention wire may be anchored to a handle grip of the handle. The retention wire may pass through a plurality of lances located in the handle. The gasket insertion apparatus may include grooves incorporated into outer circumferential edges of the frame configured to engage the retention wire. The gasket insertion apparatus may include tensioners anchored to the handle and wrapped around the retention wire. The tensioners may be configured to add tension to the retention wire. The gasket insertion apparatus may include a pair of shackles connecting the retention wire to the handle grip. The gasket insertion apparatus may include at least one turnbuckle joining one end of the retention wire to at least one shackle.

The gasket insertion apparatus may include at least three layers of material secured together. The arm member may be formed on a separate layer of material and at least one layer may have no arm members. The gasket insertion apparatus have include two arm members. The two arm members may be aligned and extend away from the handle in opposite directions. The two arm members may be offset and extend away from the handle in opposite directions. The gasket insertion apparatus may include a plurality of arm members extending from each side of the handle.

In an embodiment of the present invention, a gasket insertion apparatus is provided having: a frame, a handle, and at least one arm member extending from the handle. The apparatus is configured to align a gasket within a flange assembly when the arm member is bent to rest upon a flange of the flange assembly.

The frame may have an open-ended shape. The frame may be a curved frame having a circumference that is less than 50% of a circumference of a completely circular frame of a same radius. The gasket insertion apparatus may or may not include a plurality of teeth along an interior periphery of the frame. The gasket insertion apparatus may include an adhesive along an interior periphery of the frame. The gasket insertion apparatus may include a slit beginning at an interior periphery of the frame and extending radially along a handle shaft of the handle. The gasket insertion apparatus may include a channel in a handle shaft of the handle, the channel having a width and a depth sufficient to accommodate a stem of a leak test gasket.

The gasket insertion apparatus may include a retention wire configured to retain the gasket within the frame. The gasket insertion apparatus may include at least three layers of material secured together. The arm member may be formed on a separate layer of material. At least one layer may have no arm members. The gasket insertion apparatus may include two arm members. The two arm members may be aligned and extend away from the handle in opposite directions. The gasket insertion apparatus may include a plurality of arm members extending from each side of the handle.

In an embodiment of the present invention, a method of installing sealing gaskets in a flange assembly is provided, including: placing a sealing gasket in a gasket insertion apparatus; placing the gasket insertion apparatus between opposing flanges of the flange assembly until the gasket insertion apparatus rests upon the opposing flanges; and joining the opposing flanges of the flange assembly with the sealing gasket between the opposing flanges. The gasket insertion apparatus includes: a frame, a handle, and at least one arm member extending from the handle. The gasket insertion apparatus is configured to align the sealing gasket between the opposing flanges when the arm member is bent to rest upon a flange of the flange assembly. The method may include removing the gasket insertion apparatus from the flange assembly before completing the joining of the opposing flanges.

In an embodiment of the present invention, a gasket insertion apparatus is provided, having: a frame; a handle; and at least one retention wire. The frame is open ended and configured such that a gasket may be mounted therein. The at least one retention wire is secured to the handle and wraps around an inner circumference of the gasket mounted to the frame. The at least one retention wire is configured to retain the gasket within the frame. The retention wire may be at least one cable tie.

DESCRIPTION OF DRAWINGS

FIG. 4 is an isometric view of a gasket insertion apparatus according to an exemplary embodiment of the present invention.

FIG. 5 is a front view of the gasket insertion apparatus shown in FIG. 4.

FIG. 6 is an exploded isometric view of the gasket insertion apparatus shown in FIG. 4.

DETAILED DESCRIPTION

Figure 1:
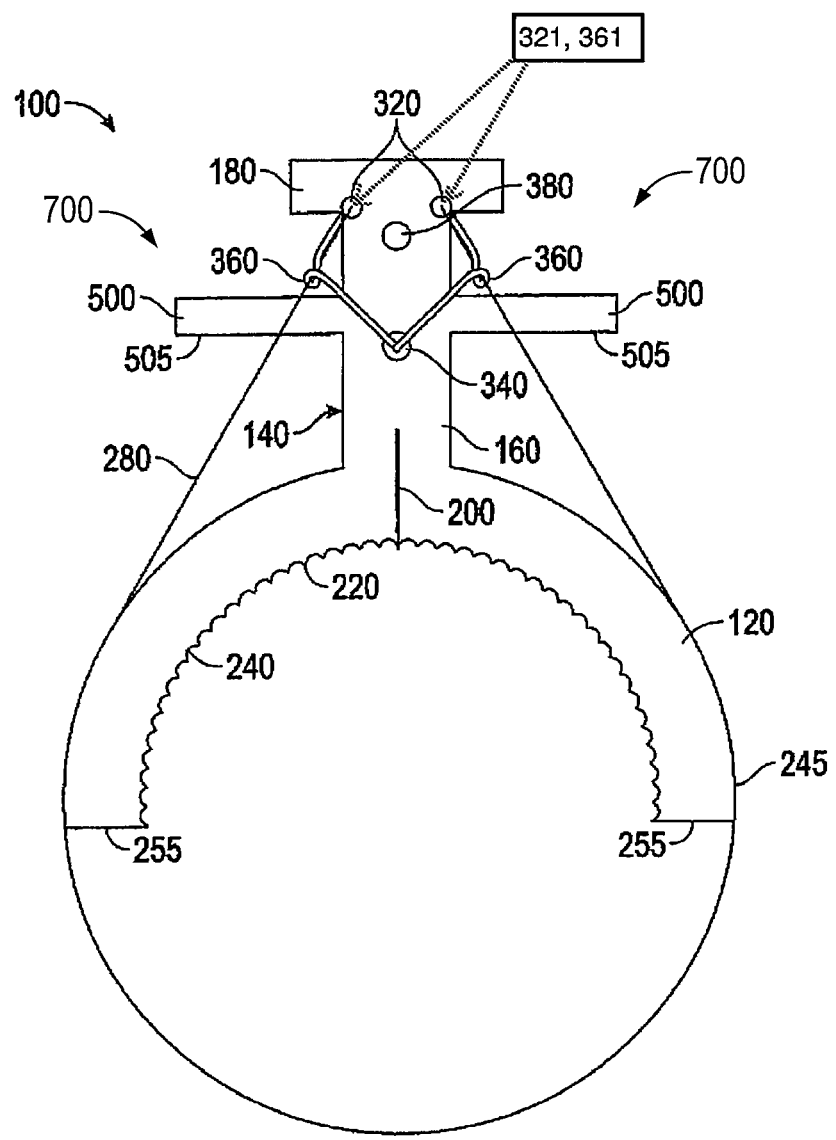
FIG. 1 is a front view of a gasket insertion apparatus according to an exemplary embodiment of the present invention.

Like reference characters denote like parts in several drawings.

Embodiments of the present invention provide a gasket insertion apparatuses having bendable arms configured to efficiently align a gasket between opposing flanges of a flange assembly. Embodiments of the present invention provide quicker, safer, and more efficient methods of aligning a gasket between opposing flanges of a flange assembly. Embodiments of the present invention may have an open-ended, curved frame which may or may not incorporate a plurality of teeth and/or extended teeth to grip a gasket placed within the open-ended frame. Embodiments of the present invention may have a substantially circular frame. Embodiments of the present invention may incorporate a handle grip which may permit manipulation of the apparatus by a diver directly or by an ROV. Embodiments of the present invention may include a retention wire and/or cable-tie to secure a gasket within the frame during insertion and alignment of the gasket. Embodiments of the present invention may include a slit in the curved frame to permit bending and/or manipulation of the frame. In further embodiments of the present invention, a channel may be incorporated which may be configured to accommodate a leak test gasket. Embodiments of the present invention may incorporate a hat brace spanning the channel.

Referring now to the drawings, and in particular to FIG. 1, there is shown a gasket insertion apparatus 100 for inserting a sealing gasket between flange connectors of adjacent pipe sections. The apparatus 100 includes a flat, curved gasket-holder frame 120 having a handle 140. The handle 140 includes a shaft 160, the proximal end of which is attached to the frame 120 so that the handle shaft extends radially outward from the outer edge of the gasket-holder frame 120. The apparatus 100 may be made of any structurally suitable material, for example, aluminum or aluminum alloys, steel, stainless steel, mild steel, polymeric composites, sheet metal, and industrial laminates. In some embodiments, the shape of frame 120 may be any of a curve, an arc, a semicircle, or any other shape appropriate to match the contour of a gasket contained therein. In certain embodiments, apparatus 100 may be formed as a single piece of material.

In certain embodiments, to facilitate removal of the entirety of apparatus 100 from within a flange assembly once a gasket has been positioned therein, frame 120 may have an open-ended shape, such as a "U" or semicircle. Embodiments of apparatus 100 include configurations disclosed in U.S. patent application Ser. No. 13/354,911, which application is incorporated herein by reference. The size of such an opening in frame 120 may be configured such that, once a gasket has been positioned within a flange assembly, apparatus 100 is removed from the assembly, but the gasket remains in place by exiting apparatus 100 through the open end of frame 120 as apparatus 100 is pulled away. In an embodiment, the circumference of curved frame 120 is approximately 55% of the circumference of a completely circular frame of the same radius. This embodiment provides a large enough opening and surface area for a gasket to exit upon positioning within a flange assembly while still stabilizing the gasket within frame 120 during transportation and placement.

A handle grip 180 may be attached to the end of shaft 160 that is distal from the frame 120. Handle grip 180 may be configured as shown in FIG. 1 or may include configurations disclosed in U.S. patent application Ser. No. 13/354,911 and U.S. patent application Ser. No. 12/939,071. The handle shaft 160 may have a split or a slit 200 that extends along the length of the handle shaft 160. Slit 200, which begins on the inside edge of frame 120 and extends radially along handle shaft 160 allows apparatus 100 to flex, bend, or otherwise temporarily or permanently distort such that all of apparatus 100 may be removed from a flange assembly while leaving the gasket in place. In certain embodiments, slit 200 begins on the inside edge of frame 120 and extends radially along handle shaft 160 for a distance of approximately the total circular width of frame 120.

Figure 3:
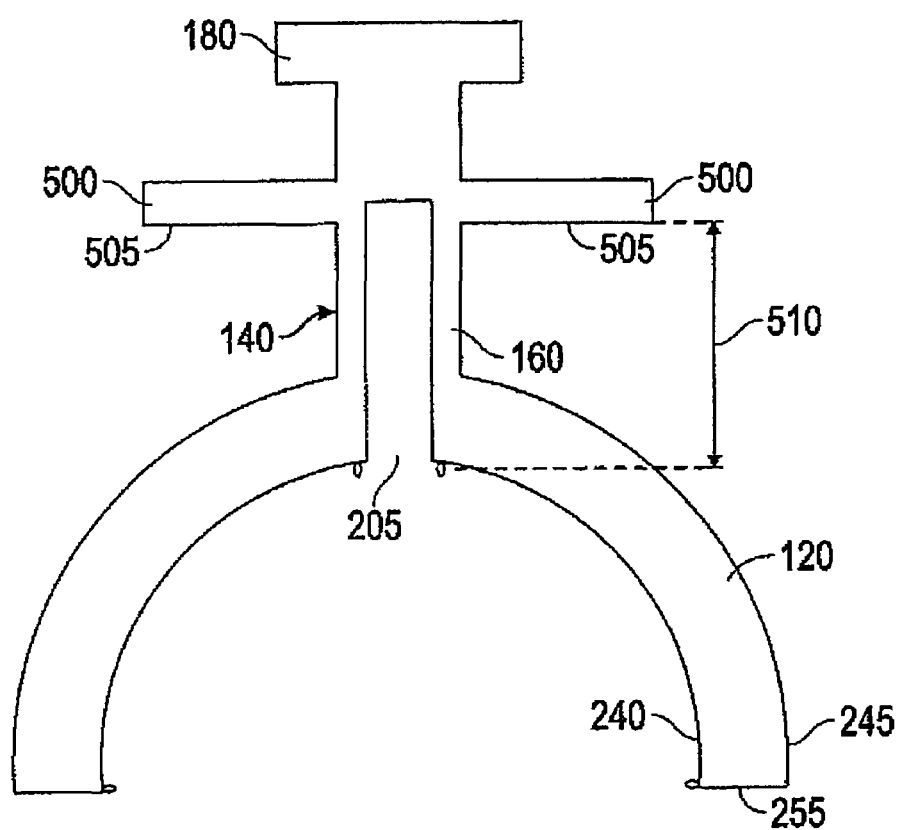
FIG. 3 is a front view of a gasket insertion apparatus having a channel within the handle shaft according to an exemplary embodiment of the present invention.
Figure 10:
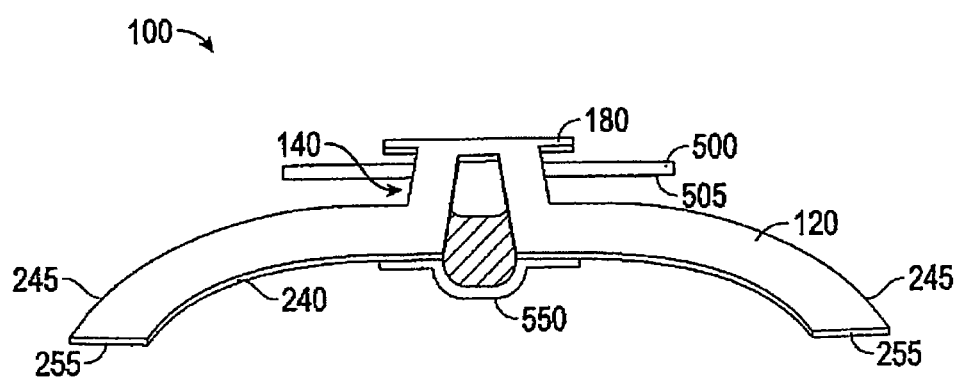
FIG. 10 is an isometric bottom view of a gasket insertion apparatus according to an exemplary embodiment of the present invention.

Embodiments of the present invention, such as shown in FIG. 3, may include a channel 205 in the handle shaft 160, channel 205 having a width and a depth sufficient to accommodate a stem of a leak test gasket such as the KaMOS® RTJ Gasket manufactured by Karmsund Maritime Offshore Supply AS. Channel 205 may be configured with dimensions sufficient to accommodate any type of gasket requiring a channel, such as channel 205, for testing leaks on a gasket or other mechanical or operational testing/use requirements of a gasket. Channel 205 may be applied to all embodiments described herein. In certain embodiments, channel 205 may also include hat brace 550, as shown in FIG. 10. Hat brace 550 may be secured to handle shaft 160 and may include a portion spanning the width of channel 205. Hat brace 550 may be configured to add rigidity to handle shaft 160 and may be configured such that a valve stem included on a leak test gasket such as the KaMOS® RTJ Gasket fits within the handle shaft 160. Hat brace 550 may be made of any structurally suitable material, for example, aluminum or aluminum alloys, steel, stainless steel, mild steel, polymeric composites, sheet metal, and industrial laminates.

Figure 7:
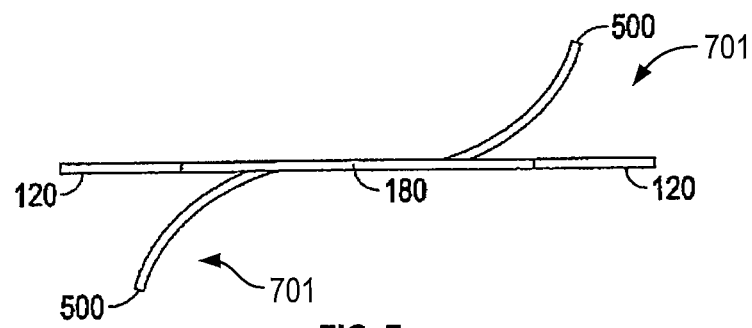
FIG. 7 is a top view of a gasket insertion apparatus according to an exemplary embodiment of the present invention.
Figure 8:
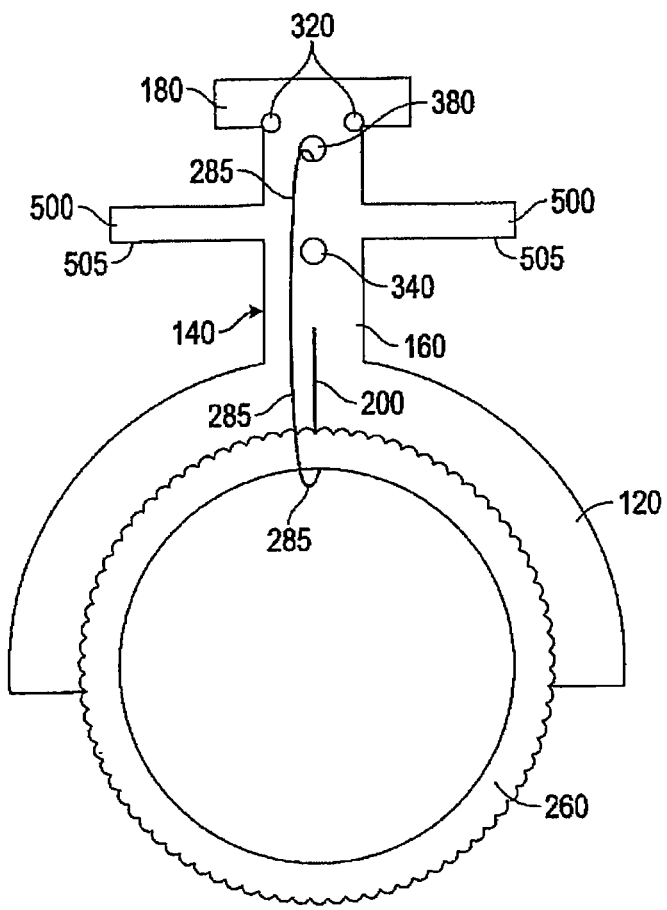
FIG. 8 is a front view of a gasket insertion apparatus having a gasket attached thereto according to an exemplary embodiment of the present invention.
Figure 9:
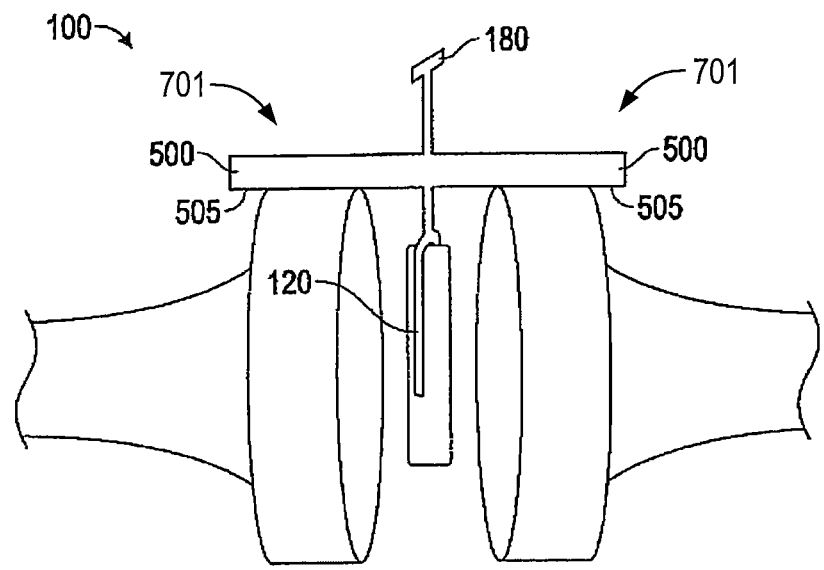
FIG. 9 is a side view of a gasket insertion device having a gasket attached thereto and placed between opposing flanges of a flange assembly according to an exemplary embodiment of the present invention.
Figure 12:
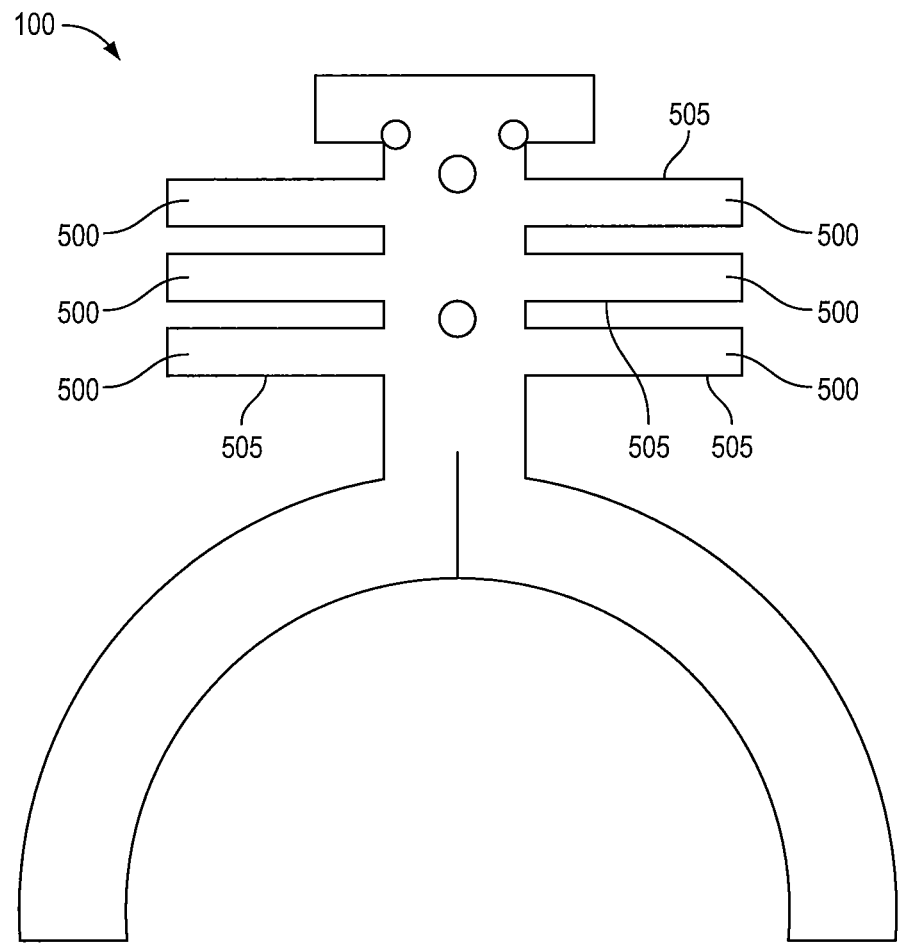
FIG. 12 is a front view of a gasket insertion apparatus according to an exemplary embodiment of the present invention.
Figure 13:
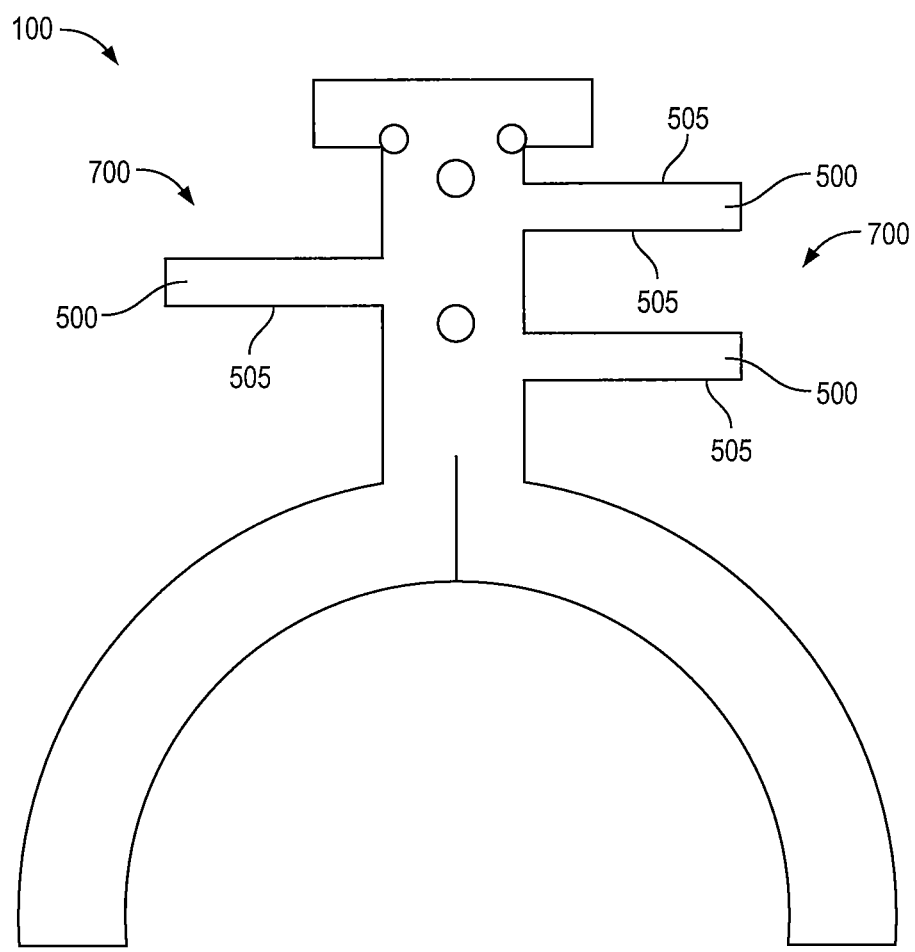
FIG. 13 is a front view of a gasket insertion apparatus according to an exemplary embodiment of the present invention.

Embodiments of the present invention include arms 500 substantially perpendicular to the handle 140 and extending therefrom. Arms 500 may extend from either side of handle 140 and there may be more than one arm extending from each side of handle 140. See, e.g., FIG. 12. Arms 500 may be aligned as shown in FIG. 1 or may be offset as shown in FIG. 13, each arm 500 in a first fixed position 700. In the example embodiment shown in FIG. 2, arms 500 extend from each side of the handle 140, each arm 500 in a first fixed position 700. Arms 500 are sufficiently malleable or flexible to permit manual bending and may be made of any structurally suitable material, for example, aluminum or aluminum alloys, steel, stainless steel, mild steel, polymeric composites, sheet metal, and industrial laminates. Arms 500 are configured such that they may be bent into an arc out of plane with frame 120 to a second fixed position 701 as shown from the top view of apparatus 100 in FIG. 7. Although shown as an arc, the arms 500 may be configured and/or bent into other configurations, such as folding or bending at a point at or near the handle 140. Arms 500 are configured such that, when bent into an arc or otherwise folded or bent out of plane with frame 120, from first fixed position 700 to second fixed position 701, a bottom edge 505 of the arms 500 rests upon flanges of a flange assembly when the apparatus is inserted between opposing flanges of the flange assembly. See FIG. 9, showing an example embodiment placed between opposing flanges of a flange assembly.

Distance 510, shown in FIG. 3, is formed by the distance between bottom edge 505 of arms 500 and the gasket inserted into the apparatus. Distance 510 is configured such that, when bottom edge 505 rests upon a flange of the flange assembly, the gasket is properly located for installation. Distance 510 may be precisely configured for an intended use of the apparatus 100 to ensure proper location of the gasket for the flange assembly being utilized. Distance 510 may be modified for different gaskets and/or flange assemblies. Distance 510 may be applied to various embodiments of the present invention, including those shown in FIGS. 1-11. Arms 500 may be bent into arcs or other configurations out of plane with frame 120 before a diver goes into the water. Apparatus 100 may be pre-configured with bent arms 500 and a gasket secured therein such that a diver may simply drop apparatus 100 between opposing flanges to ensure proper installation of the gasket before securing opposing flanges of a flange assembly together. Arms 500 may be utilized to align a leak test or other gasket requiring channel 205 wherein locator pins are not available to locate the gasket. With arms 500, gaskets requiring channel 205 are generally manually aligned.

Embodiments having multiple arms with varying distances between the interior periphery of the curved frame 120 and bottom edges 505 (see, e.g., FIGS. 12 and 13) provide adjustable configurations wherein the arm or arms 500 providing the proper alignment depth may be bent out of plane to rest upon a flange and align the gasket. These embodiments may be utilized for different size flange assemblies corresponding to the different arm options.

The interior periphery 240 of the curved frame 120 may be or may not be provided with a plurality of serrations or angularly cut teeth 220. These teeth 220 serve to grab and hold in place a resilient gasket positioned within the interior periphery 240 of the frame 120. The gasket is positioned on the frame so that the outer diameter of the gasket will fit against the interior periphery 240 of the curved frame 120. While teeth 220 are shown in FIG. 1, other arrangements may be used so long as they grip or secure a gasket to apparatus 100. For example, gripping adhesives, serrations, threads, prongs, bumps, smooth surfaces, and/or any other appropriate shapes or surfaces may also be used, including smooth surfaces used for pressure fitting (e.g., 55% diameter surface where gasket is snug-fit into the frame and/or the frame is deformed to accommodate the gasket). Various adhesives may be used to secure a gasket into the frame, which adhesives may be designed to dissolve or break down over time such that the gasket may be released from the frame after a period of time.

Figure 2:
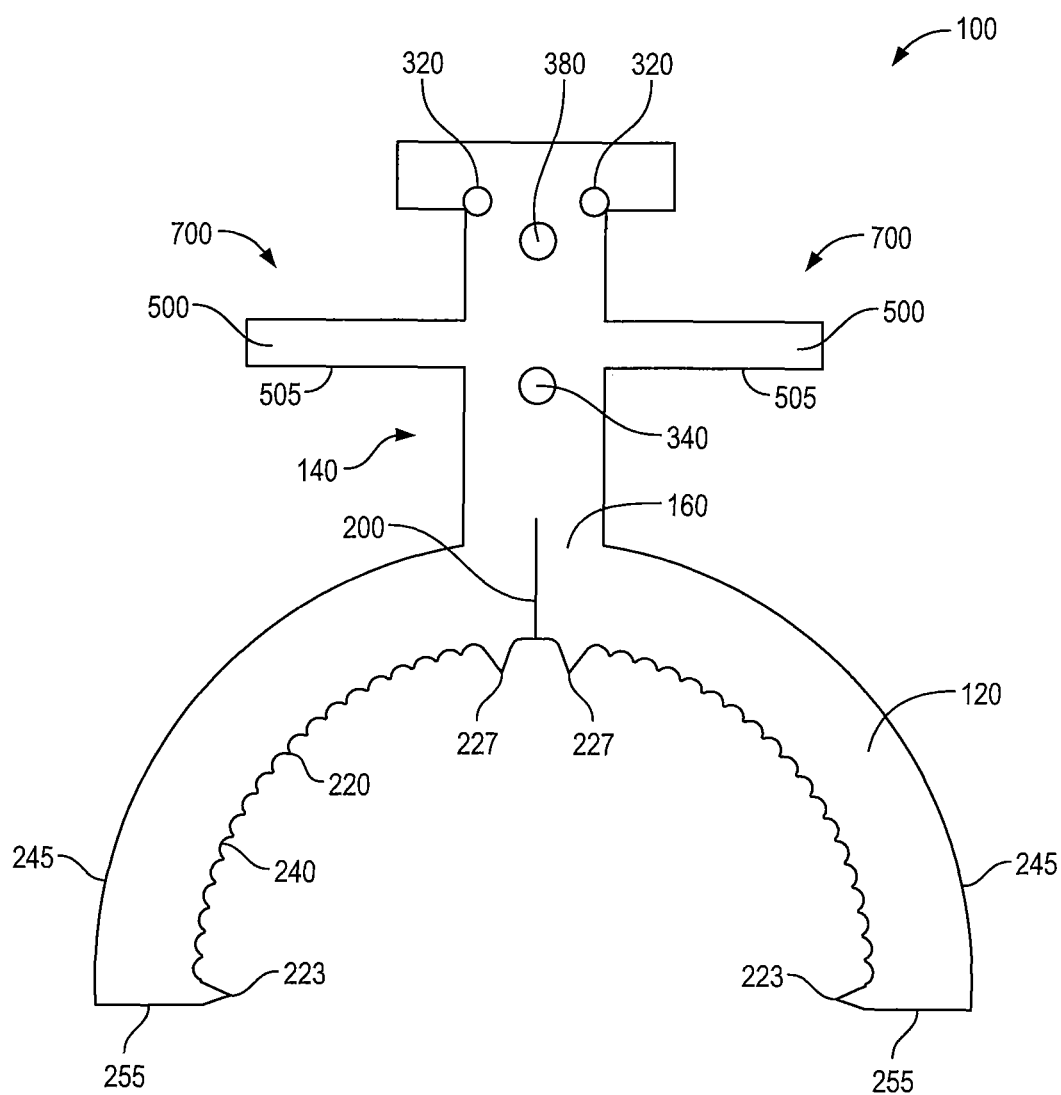
FIG. 2 is a front view of a gasket insertion apparatus having extended teeth according to an exemplary embodiment of the present invention.

In still further embodiments, as shown in FIG. 2, extended teeth 223 and 227 may be incorporated into the interior periphery 240 of frame 120. Extended teeth 223 may be incorporated near ends 255 of frame 120. Extended teeth 227 may be incorporated near slit 200 as shown in FIG. 2. Extended teeth 223 and 227 may be incorporated together or separately and may be incorporated with smaller teeth 220 interspersed between extended teeth 223 and 227. Embodiments incorporating extended teeth maximize retention of a gasket within the apparatus for installation. Apparatus 100 may or may not be configured to have extended teeth 223 and/or 227 with or without retention wire 280.

Retention wire 280 may be anchored to handle grip 180 via holes 320. Embodiments may incorporate shackles 321 to connect retention wire 280 to holes 320. Embodiments may include one or more turnbuckles 361 between retention wire 280 and the shackles 321. The one or more turnbuckles 361 may be utilized to increase tension in retention wire 280.

Figure 11:
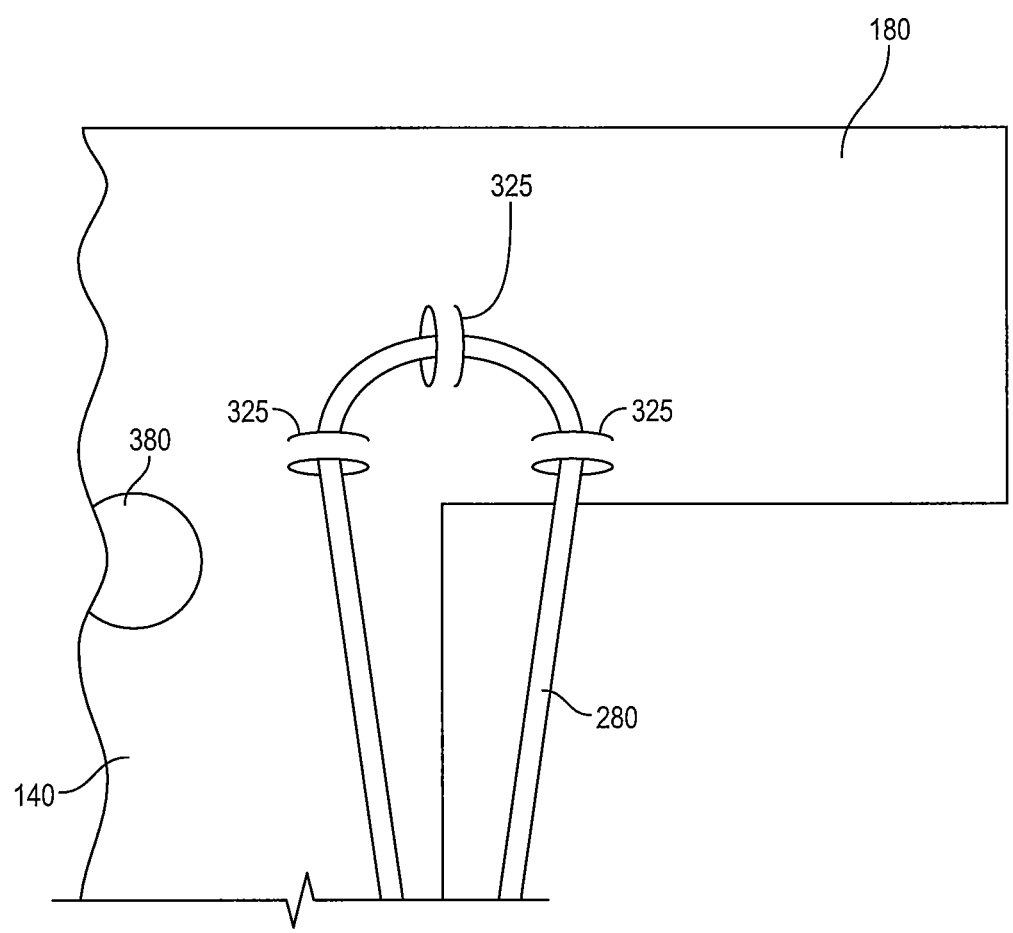
FIG. 11 is a front view of a portion of a handle of a gasket insertion apparatus according to an exemplary embodiment of the present invention.

In other embodiments, wire 280 may pass through and/or be secured by one or more lances 325. See, e.g., FIG. 11. FIG. 11 shows only a portion of a gasket insertion apparatus according to an embodiment of the present invention. As shown, this embodiment may include up to three lances 325 configured as part of handle grip 180. Wire 280 passes through each of the lances 325. Not shown in FIG. 11 is the other half of handle grip 180 which also has three lances 325 and wire 280 passing through the lances 325. Embodiments do not require three lances on each side of the handle grip and may include one or more lances on each or either side of handle grip 180. Wire 280 may be solid, braided (as in a rope or a string), or any other suitable construct. Wire 280 may also be in the form of a metal or plastic band. Wire 280 may be comprised of nylon, copper, steel, aluminum, rubber, or any other suitable material, including various composite materials. In one embodiment of the present invention, retention wire 280 is a 1/32" 3×7 stainless steel (US military spec grade) wire rope. In certain embodiments, holes 320 are 1/8" holes.

Retention wire 280 is configured to wrap around the outer circumference of frame 120 and make contact with a gasket such that the gasket is restrained within the interior periphery 240 of frame 120. Grooves 300 may be incorporated into outer circumferential edges of frame 120 and hold retention wire 280 in place such that wire 280 is prevented from slipping off of outer periphery 245 of frame 120. Grooves 300 may be formed by etching, sawing, milling, or any other appropriate cutting technique. The width of the grooves 300 is configured such that retention wire 280 remains engaged within the grooves 300, but loose enough such that wire 280 can be pulled out of the grooves 300 once wire 280 has been cut. One or more tensioners 360 may be anchored to handle 160 via hole 340. Tensioners 360 may be adjustable and may be configured to pull retention wire 280 towards handle 160 such that retention wire 280 is tightened about the gasket once it is in place within interior periphery 240. In certain embodiments, tensioners 360 may be cable-ties (for example, tie-wraps), rubber bands, turn buckles, or any appropriate tensioning device. For example, FIG. 1 shows tensioners 360 as cable-ties. In such embodiments, one or more cable-ties 360 are looped around wire 280 and through hole 340. Once a gasket is in place, the one or more cable-ties 360 may be tightened by adjusting a locking or securing mechanism such that wire 280 is pulled and secured inward towards handle 160, thereby increasing the tension of wire 280 about the gasket.

In alternate embodiments, cable-tie 285 may be configured to wrap around an interior arc surface of a gasket secured to the interior periphery 240. In the embodiment shown in FIG. 8, cable-tie 285 extends from hole 380, wraps around the interior arc surface of gasket 260 and returns for fastening to hole 380. In such embodiments, cable-tie 285 may extend from hole 340 or hole 380 or similar and may return to the same or a different hole or fastening location. A loop may be created using cable-tie 285 by fastening separate ends of cable-tie 285 together after wrapping cable-tie 285 around the interior arc surface of the gasket and passing the cable-tie 285 through hole 340, hole 380 or similar. The loop may be sufficiently tight to secure the gasket to the apparatus. Additional embodiments utilizing retention wire 280 and/or cable-tie 285 to secure the gasket to the interior periphery 240 may be utilized. Although described utilizing various configurations of retention wire 280 and cable-tie 285, the gasket may also be secured to the interior periphery 240 by hammering or forcing the gasket into the interior periphery 240 of frame 120 without retention wire 280.

Figure 14:
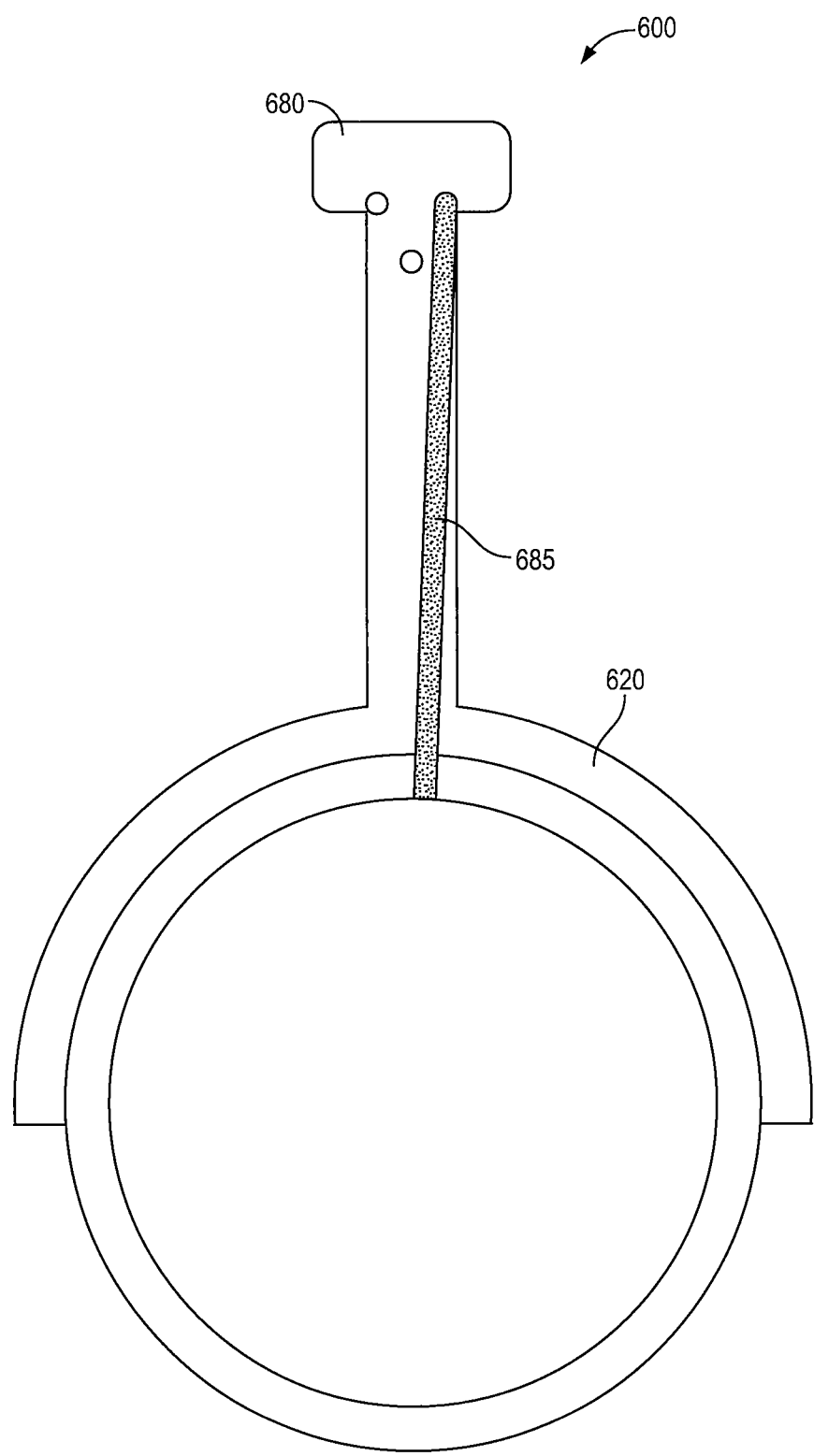
FIG. 14 is a front view of a gasket insertion apparatus according to an exemplary embodiment of the present invention.

In further embodiments, wings may not be provided on the apparatus. See, e.g., FIG. 14. As shown, the apparatus 600 includes frame 620 which may be a half circle or may be less than a half circle. Handle grip 680 is provided and cable-tie 685 is wrapped around the gasket and secured to handle grip 685. Frame 620 has all of the features disclosed herein for frame 120. Similarly, handle grip 680 has all of the features disclosed herein for handle grip 180.

Handle 160 may further include one or more holes 380. In certain embodiments, one or more of holes 380 may be configured to accept and firmly hold a threaded stud, dowel, pin, or other such cylindrical member which may rest atop exterior of flange to position gasket accurately. In further embodiments, one or more of holes 380 may be used to attach a hook, tether, or line to apparatus 100 for use in lowering or raising the device.

The gasket insertion apparatus 100 may be configured for use by positioning a ring-shaped gasket within the interior periphery 240 of the frame 120 so that the outer diameter of the gasket is fitted against the interior periphery 240 of the curved frame 120. In open or U-shaped embodiments, retention wire 280 contacts the gasket at the open end of frame 210 such that, when retention wire 280 is tightened by tensioners 360, the gasket is restrained within the interior periphery 240 of the frame 120. Fitting the gasket within the frame 120 in that manner will allow the teeth 220 and retention wire 280 to hold the gasket in place within the interior periphery 240 of the frame 120. Alternatively, no teeth may be used and retention wire 280 may secure the gasket in place.

Use of the combination of the insertion apparatus 100 and a gasket fitted within the frame 120 as described herein will allow a diver to effectuate placement of the gasket between connection flanges of pipeline segments using only arms 500 for alignment of the gasket. Alignment pins are not required and a diver does not have to place his hands or fingers between the flanges. Thus, a diver (or ROV) will be able to place and position the gasket in the desired location without having to connect most of the bolts associated with the connection flanges. Moreover, because the arms 500 align the gasket, insertion and alignment is accomplished with a single piece of equipment quickly and efficiently.

Referring to the example embodiments shown in FIGS. 4 to 6, apparatus 100 may include multiple layers. In FIGS. 4 and 5, the example apparatus 100 includes three separate layers that have been secured together. FIG. 6 is an exploded isometric view showing each of the three layers before being secured together. The various layers may be secured together via tack welding or any other method known to secure the chosen materials together. As shown, first layer 101 and third layer 103 each have a single arm 500. When secured together, first layer 101, second layer 102, and third layer 103 are arranged such that the arms 500 of first layer 101 and third layer 103 extend in opposing directions from a single handle formed by all three layers together. Alternatively, second layer 102 may have one or more arms 500 and both the first layer 101 and third layer 102 may have zero or two arms. When assembled, apparatus 100 may have multiple arms extending from each side of handle 140.

Using multiple layers to construct apparatus 100 allows for apparatus 100 to be substantially rigid while permitting the arms 500 to be sufficiently malleable to permit manual bending. Multiple layers also simplifies incorporation of the grooves 300 into outer circumferential edges of frame 120 described above and holding retention wire 280 to frame 120 in FIG. 1. Instead of machining in the grooves 300, the grooves 300 may be formed by outer edges of first layer 101 and third layer 103 extending beyond outer edges of second layer 102. In production of second layer 102, the outer periphery of frame 120, as it approaches ends 255 of the arc, may be reduced such that the outer periphery sections of first layer 101 and third layer 103 will extend beyond that of second layer 102 when all three layers are secured together, leaving a groove 300. In certain embodiments, the groove 300 may extend from ends 255 of frame 120 at exterior periphery 245 of arc 120, approximately twenty-five percent to interior periphery 240. A vertical groove length may extend from a horizontal plane of arc 120, approximately vertical until it reaches exterior periphery 245 of arc 120.

According to an exemplary embodiment of the present invention, a method is provided to use the apparatus 100 to insert a gasket into a closed faced connection flange or similar flange assembly having little or no space for any part of the apparatus to remain in the completed assembly. A gasket is frictionally mounted in place on its radial periphery by teeth 220 or another contact surface that is provided around the interior periphery 240 of the frame 120. Retention wire 280 may be wrapped around the outer circumferential surface of frame 120 through grooves 300 and tightened with tensioners 360 such that gasket is restrained within the interior periphery 240 of frame 120 and prevented from falling out of the open end during transportation and insertion of the gasket. The apparatus 100 and the mounted gasket may then be brought to the location where the flanged connection is to be made. The closed face flanges of adjacent pipe segments may be brought together and held in place. The gasket may then be installed by placing the insertion apparatus 100, with the gasket in place, between the flanges until arms 500 rest upon opposing flanges. In certain embodiments, a threaded stud, dowel, pin or other such cylindrical member seated through holes 380 may be configured to rest upon opposing flanges. Connection bolts may then be installed to stabilize the flange and gasket configuration. Retention wire 280 may then be cut to allow the removal of apparatus 100 to allow the gasket to remain in place between the flanges in the ring groove. The apparatus 100 may then be removed by pulling the apparatus 100 away from the flanges leaving the gasket in place, and the remainder of the connection bolts may then be inserted and/or tightened to complete the connection of the pipe segments 320.

While the embodiments are described with reference to various implementations and exploitations, it will be understood that these embodiments are illustrative and that the scope of the inventions is not limited to them. Many variations, modifications, additions, and improvements are possible. Further still, any steps described herein may be carried out in any desired order, and any desired steps may be added or deleted. The specification and drawings are accordingly to be regarded in an illustrative rather than in a restrictive sense.

What is claimed is:

1. A gasket insertion apparatus comprising:
   a frame configured to have a gasket mounted therein;
   a handle; and
   at least one adjustable arm member extending from the handle, the at least one adjustable arm member formed from a malleable material and configured to transition from a first fixed position, in a same plane relative to the handle, to a second fixed position, the second fixed position not in the same plane relative to the handle, wherein a bottom edge of the at least one adjustable arm member is configured to rest upon a flange of a flange assembly when the at least one adjustable arm member is in the second fixed position.

2. The gasket insertion apparatus of claim 1, wherein in the first fixed position relative to the handle, the frame, the handle and the at least one adjustable arm member are substantially flat and are substantially in a plane with each other.

3. The gasket insertion apparatus of claim 2, wherein in the second fixed position relative to the handle, the at least one adjustable arm member is configured to be bent out of plane with the frame and the handle.

4. The gasket insertion apparatus of claim 1, wherein a distance between the bottom edge of the at least one adjustable arm member and an interior periphery of the frame is configured to align the gasket within the flange assembly.

5. The gasket insertion apparatus of claim 1, wherein the frame has an open-ended shape.

6. The gasket insertion apparatus of claim 5, wherein the frame is a curved frame having a circumference that is approximately 55% of a circumference of a completely circular frame of a same radius.

7. The gasket insertion apparatus of claim 5, wherein the frame is a curved frame having a circumference that is less than approximately 50% of a circumference of a completely circular frame of a same radius.

8. The gasket insertion apparatus of claim 5, further comprising: a plurality of teeth along an interior periphery of the frame.

9. The gasket insertion apparatus of claim 5, further comprising: a slit beginning at an interior periphery of the frame and extending radially along a handle shaft of the handle.

10. The gasket insertion apparatus of claim 5, further comprising: a retention wire configured to retain the gasket within the frame.

11. The gasket insertion apparatus of claim 10, wherein the retention wire is anchored to a handle grip of the handle.

12. The gasket insertion apparatus of claim 11, further comprising: a pair of shackles connecting the retention wire to the handle grip.

13. The gasket insertion apparatus of claim 12, further comprising at least one turnbuckle joining one end of the retention wire to at least one shackle.

14. The gasket insertion apparatus of claim 10, further comprising: grooves incorporated into outer circumferential edges of the frame configured to engage the retention wire.

15. The gasket insertion apparatus of claim 10, further comprising: tensioners anchored to the handle and wrapped around the retention wire;
   wherein the tensioners are configured to add tension to the retention wire.

16. The gasket insertion apparatus of claim 1, wherein the frame is substantially circular.

17. The gasket insertion apparatus of claim 1, further comprising: a channel in a handle shaft of the handle, the channel having a width and a depth to accommodate a stem of a leak test gasket.

18. The gasket insertion apparatus of claim 1, further comprising two adjustable arm members.

19. The gasket insertion apparatus of claim 18, wherein the two adjustable arm members are aligned and extend away from the handle in opposite directions.

20. A gasket insertion apparatus comprising:
   a frame;
   a handle; and
   at least one adjustable arm member extending from the handle, the at least one adjustable arm member formed from a malleable material and configured to transition from a first fixed position, the first fixed position in a same plane relative to the handle, to a second fixed position, the second fixed position not in the same plane relative to the handle,
   wherein the gasket insertion apparatus is configured to align a gasket within a flange assembly when the at least one adjustable arm member is bent into the second fixed position to rest the at least one adjustable arm member upon a flange of the flange assembly.

21. The gasket insertion apparatus of claim 20, wherein the frame has an open-ended shape.

22. The gasket insertion apparatus of claim 21, wherein the frame is a curved frame having a circumference that is less than approximately 50% of a circumference of a completely circular frame of a same radius.

23. The gasket insertion apparatus of claim 21, further comprising: a plurality of teeth along an interior periphery of the frame.

24. The gasket insertion apparatus of claim 21, further comprising: a channel in a handle shaft of the handle, the channel having a width and a depth to accommodate a stem of a leak test gasket.

25. The gasket insertion apparatus of claim 21, further comprising: a retention wire configured to retain the gasket within the frame.

26. The gasket insertion apparatus of claim 20, further comprising two adjustable arm members.

27. The gasket insertion apparatus of claim 26, wherein the two adjustable arm members are aligned and extend away from the handle in opposite directions.

* * * * *